United States Patent
Liao et al.

(10) Patent No.: US 10,923,950 B2
(45) Date of Patent: Feb. 16, 2021

(54) POWER GENERATING METHOD AND WIRELESS POWER TRANSMISSION DEVICE THEREFOR

(71) Applicant: Delta Electronics (Thailand) Public Company Limited, Samutprakarn (TH)

(72) Inventors: Yongkai Liao, Samutprakarn (TH); Shuailin Du, Samutprakarn (TH); Shuyang Wang, Samutprakarn (TH); Kai Dong, Samutprakarn (TH); Jinfa Zhang, Samutprakarn (TH)

(73) Assignee: DELTA ELECTRONICS (THAILAND) PUBLIC COMPANY LIMITED, Samutprakarn (TH)

( * ) Notice: Subject to any disclaimer, the term of this patent is extended or adjusted under 35 U.S.C. 154(b) by 253 days.

(21) Appl. No.: 16/013,660

(22) Filed: Jun. 20, 2018

(65) Prior Publication Data
US 2019/0081510 A1   Mar. 14, 2019

(30) Foreign Application Priority Data
Sep. 12, 2017 (CN) .......................... 201710818260.3

(51) Int. Cl.
| | |
|---|---|
| *H02J 50/10* | (2016.01) |
| *H02J 50/80* | (2016.01) |
| *H04B 5/00* | (2006.01) |
| *H02J 50/70* | (2016.01) |
| *H04W 84/12* | (2009.01) |
| *H04W 4/80* | (2018.01) |

(52) U.S. Cl.
CPC .............. *H02J 50/10* (2016.02); *H02J 50/70* (2016.02); *H04B 5/0031* (2013.01); *H04B 5/0037* (2013.01); *H04B 5/0075* (2013.01); H02J 50/80 (2016.02); H04W 4/80 (2018.02); H04W 84/12 (2013.01)

(58) Field of Classification Search
CPC ........ H02J 50/10; H02J 50/80; H04B 5/0031; H04B 5/0037; H04B 5/0075
See application file for complete search history.

(56) References Cited

U.S. PATENT DOCUMENTS

| | | | |
|---|---|---|---|
| 2013/0043734 A1* | 2/2013 | Stone ...................... | H02J 50/12 307/104 |
| 2017/0358950 A1* | 12/2017 | Zeine ...................... | H02J 50/90 |

FOREIGN PATENT DOCUMENTS

| | | |
|---|---|---|
| CN | 204068438 U | 12/2014 |
| CN | 105576845 A | 5/2016 |

* cited by examiner

*Primary Examiner* — Rexford N Barnie
*Assistant Examiner* — Elim Ortiz
(74) *Attorney, Agent, or Firm* — Kirton McConkie; Evan R. Witt

(57) ABSTRACT

A power generating method for a wireless power transmission device includes the following steps. Firstly, a power transmitting circuit is switched between an enabled state and a disabled state. When the power transmitting circuit is in the enabled state, the power transmitting circuit emits a first power and the power receiving circuit converts the first power into a second power. Then, the second power is converted into an output power, and the second power is converted into an auxiliary power. If the first power is not received by a power receiving circuit, the above steps are repeated. If the first power is received by the power receiving circuit, the power transmitting circuit is continuously in the enabled state, so that the auxiliary power is continuously generated.

13 Claims, 9 Drawing Sheets

POWER GENERATING METHOD AND WIRELESS POWER TRANSMISSION DEVICE THEREFOR

CROSS-REFERENCE TO RELATED APPLICATION

This application claims priority to China Patent Application No. 201710818260.3, filed on Sep. 12, 2017, the entire content of which is incorporated herein by reference for all purposes.

FIELD OF THE INVENTION

The present invention relates to a power generating method and a wireless power transmission device therefor, and more particularly to a power generating method for generating auxiliary power and a wireless power transmission device therefor.

BACKGROUND OF THE INVENTION

As known, an electronic device is equipped with an auxiliary power source to provide power to the internal components such as a control circuit. Generally, the power of the auxiliary power source is derived from the power of a DC bus in the electronic device. FIG. 1 is a schematic circuit block diagram illustrating a portion of a conventional electronic device. The electronic device comprises a first converter 10, a second converter 11 and an auxiliary power converter 12. After an input AC power is received by the first converter 10, the input AC power is converted into a DC bus power by the first converter 10. Then, the DC bus power is converted into an output DC power by the second converter 11. Moreover, the DC bus power is converted into an auxiliary power by the auxiliary power converter 12. The auxiliary power supplies the components of the first converter 10 and the second converter 11. As mentioned above, it is a conventional approach for generating the auxiliary power that the input AC power is firstly converted into the DC bus power, and then the DC bus power is converted into the auxiliary power.

Recently, a wireless power transmission device has been introduced into the market. The wireless power transmission device comprises a transmitter side and a receiver side. The transmitter side comprises a transmitter coil. The receiver side comprises a receiver coil. After an input power is received by the transmitter side, the input power is converted into a high-frequency alternating current by the transmitter coil and thus an alternating magnetic field is generated. Then, the receiver coil generates a high-frequency alternating current according to the electromagnetic coupling between the receiver coil and the transmitter coil.

The transmitter side circuit and the receiver side circuit of the wireless power transmission device are not electrically connected with each other. Conventionally, there are two approaches for allowing the receiver side circuit to generate the auxiliary power for the components of the receiver side. Firstly, when the wireless power transmission device is used to charge a power battery, the receiver side of the wireless power transmission device uses the power from the power battery to generate the auxiliary power. Secondly, an external battery (e.g., a dry battery or a storage battery) is connected to the receiver side of the wireless power transmission device, and the power of the external battery is used for generating the auxiliary power.

However, the above two approaches still have some drawbacks. For example, the battery is used as the power source for generating the auxiliary power of the receiver side of the wireless power transmission device. In the case that the wireless power transmission device is disabled, the battery is still continuously discharged in a weak current. Consequently, the battery may be suffered from an over-discharged problem. Under this circumstance, the conventional wireless power transmission device cannot stably generate the auxiliary power. Since it is necessary to manually maintain the energy of the battery, the cost is increased. In other words, the conventional wireless power transmission device is not user-friendly.

Therefore, there is a need of providing a power generating method and a wireless power transmission device therefor in order to overcome the above drawbacks.

SUMMARY OF THE INVENTION

An object of the present invention provides a power generating method and a wireless power transmission device therefor. The power received by the transmitter side is used as the power source of the auxiliary power at the receiver side. Consequently, the auxiliary power is generated stably. In accordance with the present invention, the transmitter side is selectively switched between an enabled state and a disabled state. If the power cannot be wirelessly transmitted between the receiver side and the transmitter side, the transmitter side is not continuously in the enabled state. Consequently, the power loss is reduced In accordance with an aspect of the present invention, there is provided a power generating method for a wireless power transmission device. The wireless power transmission device includes a power transmitting circuit, a power receiving circuit, a power converter and an auxiliary power generation circuit. The power transmitting circuit is located at a transmitter side. The power receiving circuit, the power converter and the auxiliary power generation circuit are located at a receiver side. The power transmitting circuit receives an input power. The power transmitting circuit and the power receiving circuit are electromagnetically coupled with each other. The power generating method includes the following steps. In a step (a), the power transmitting circuit is switched between an enabled state and a disabled state. In a step (b), the power transmitting circuit emits a first power and the power receiving circuit receives the first power and converts the first power into a second power when the power transmitting circuit is in the enabled state. In a step (c), the power converter converts the second power into an output power, and the auxiliary power generation circuit converts the second power into an auxiliary power. The, a step (d) is performed to judge whether the power receiving circuit receives the first power. In a step (e), if a judging result of the step (d) indicates that the first power is not received by the power receiving circuit, the step (a) is repeated. In a step (f), if the judging result of the step (d) indicates that the first power is received by the power receiving circuit, allowing the power transmitting circuit to be continuously in the enabled state, so that the auxiliary power is continuously generated.

In accordance with another aspect of the present invention, there is provided a wireless power transmission device. The wireless power transmission device includes a power transmitting circuit, a power receiving circuit, a power converter and an auxiliary power generation circuit. The power transmitting circuit receives an input power and emits a first power. The power transmitting circuit and the power receiving circuit are electromagnetically coupled with each other. The power receiving circuit receives the first power and converts the first power into a second power. The power converter is used for converting the second power into an output power. The auxiliary power generation circuit is electrically connected with the power receiving circuit and the power converter. The auxiliary power generation circuit converts the second power into an auxiliary power and transmits the auxiliary power to the power converter.

In accordance with a further aspect of the present invention, there is provided a power generating method for a wireless power transmission device. The wireless power transmission device includes a power transmitting circuit, a power receiving circuit, a power converter and an auxiliary power generation circuit. The power transmitting circuit is located at a transmitter side. The power receiving circuit, the power converter and the auxiliary power generation circuit are located at a receiver side. The power transmitting circuit receives an input power. The power transmitting circuit and the power receiving circuit are electromagnetically coupled with each other. The power generating method includes the following steps. Firstly, the power transmitting circuit is in an enabled state. When the power transmitting circuit is in the enabled state, the power transmitting circuit emits a first power and the power receiving circuit receives the first power and converts the first power into a second power. Then, the power converter converts the second power into an output power, and the auxiliary power generation circuit converts the second power into an auxiliary power.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
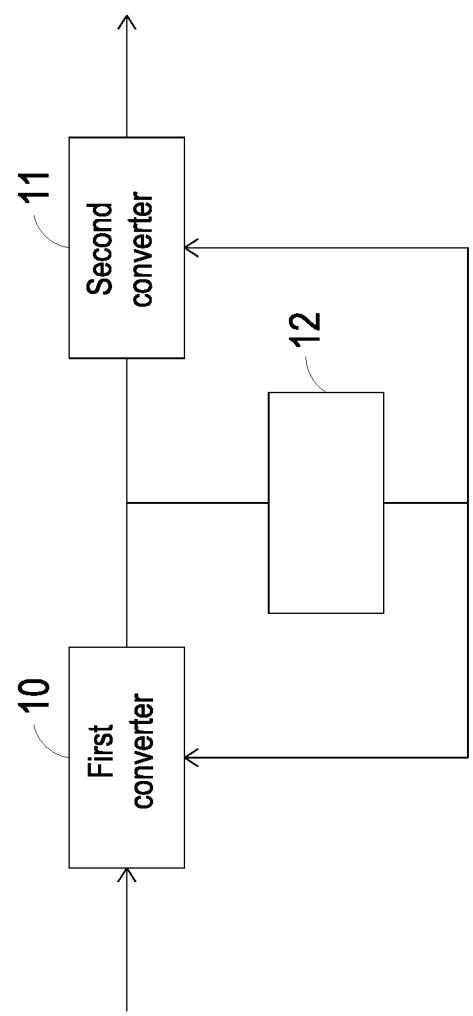
FIG. 1 is a schematic circuit block diagram illustrating a portion of a conventional electronic device.
Figure 2:
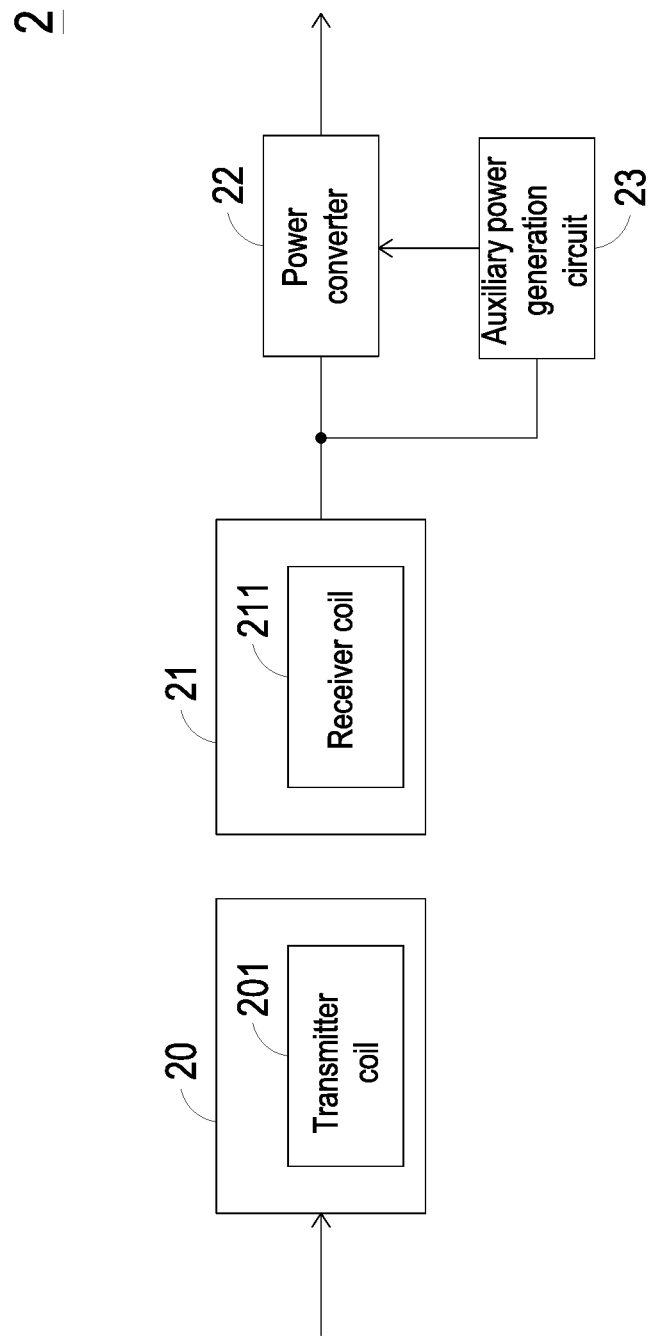
FIG. 2 is a schematic circuit diagram illustrating a wireless power transmission device according to an embodiment of the present invention.

FIG. 2 is a schematic circuit diagram illustrating a wireless power transmission device according to an embodiment of the present invention. As shown in FIG. 2, the wireless power transmission device 2 comprises a power transmitting circuit 20, a power receiving circuit 21, a power converter 22 and an auxiliary power generation circuit 23. The power transmitting circuit 20 is located at a transmitter side. The power receiving circuit 21 is located at a receiver side.

The power transmitting circuit 20 receives an input power and emits a first power. The power transmitting circuit 20 and the power receiving circuit 21 are physically isolated from each other. Moreover, the power transmitting circuit 20 and the power receiving circuit 21 are electromagnetically coupled with each other. After the first power from the power transmitting circuit 20 is received by the power receiving circuit 21, the first power is converted into a second power by the power receiving circuit 21. The power converter 22 is electrically connected with the power receiving circuit 21. The second power is converted into an output power by the power converter 22. The output power is provided to a load (not shown). The output power is a DC output power or an AC output power. The input terminal of the auxiliary power generation circuit 23 is electrically connected with the power receiving circuit 21 to receive the second power. The second power is converted into an auxiliary power by the auxiliary power generation circuit 23. The auxiliary power is provided to the circuits (not shown) at the receiver side of the wireless power transmission device 2. In the embodiment of FIG. 2, the output terminal of the auxiliary power generation circuit 23 is electrically connected with the power converter 22. Consequently, the auxiliary power generation circuit 23 provides the auxiliary power to the power converter 22. For example, the auxiliary power generation circuit 23 provides the auxiliary power to a controller (not shown) of the power converter. Moreover, the second power is converted into the output power by the power converter 22.

Moreover, the power transmitting circuit 20 further comprises a transmitter coil 201, and the power receiving circuit 21 further comprises a receiver coil 211. The transmitter coil 201 emits the first power. The receiver coil 211 and the transmitter coil 201 are electromagnetically coupled with each other. After the first power from the transmitter coil 201 is received by the receiver coil 211, the first power is converted into the second power by the receiver coil 211.

Figure 3:
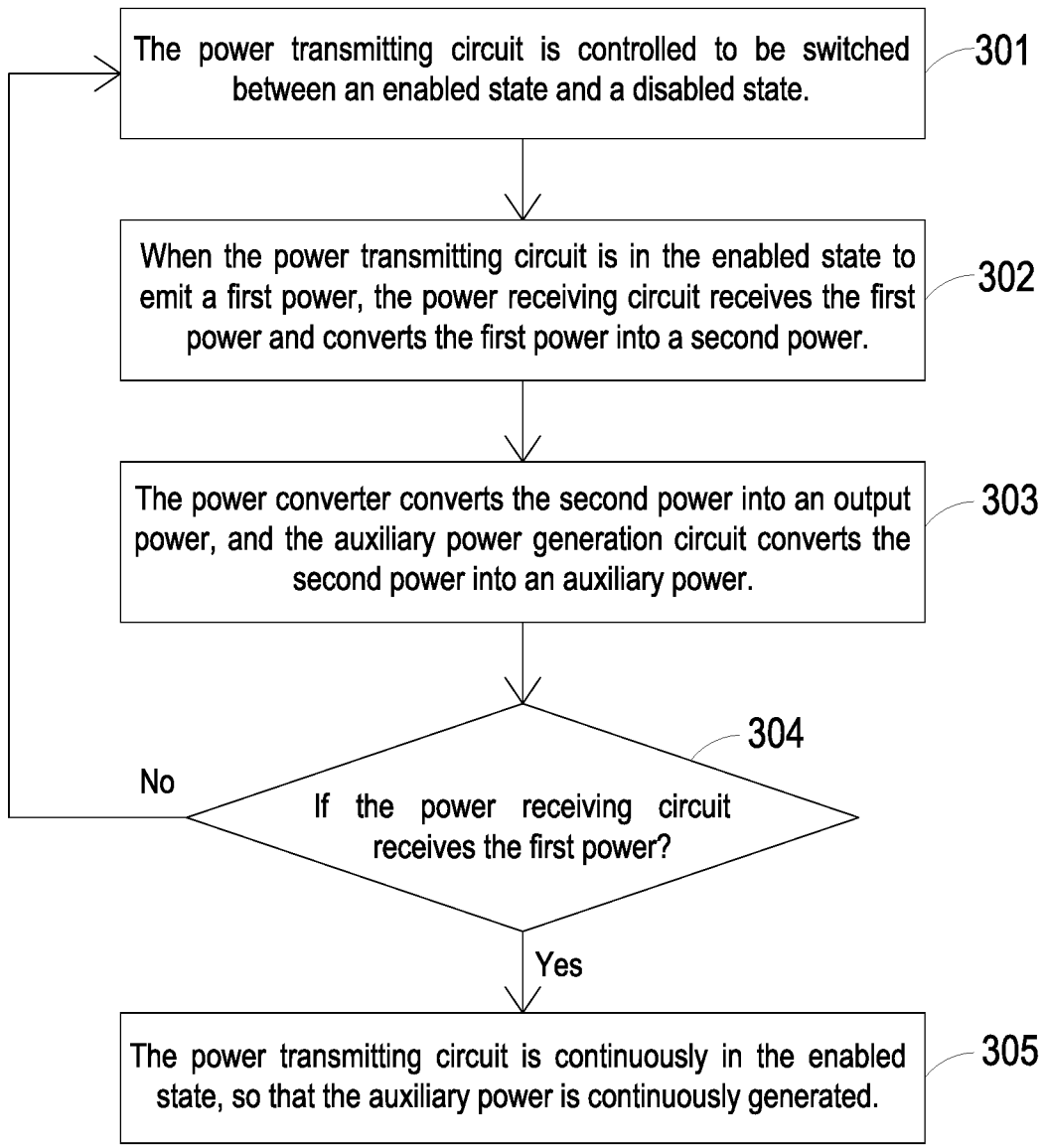
FIG. 3 is a flowchart illustrating a power generating method according to a first embodiment of the present invention.

FIG. 3 is a flowchart illustrating a power generating method according to a first embodiment of the present invention. The power generating method is applied to the wireless power transmission device 2 of FIG. 2. The power generating method comprises the following steps.

Firstly, in a step 301, the power transmitting circuit 20 is controlled to be switched between an enabled state and a disabled state. When the power transmitting circuit 20 is in the disabled state, the power transmitting circuit 20 does not operate. When the power transmitting circuit 20 is in the enabled state, the power transmitting circuit 20 normally operates. In this embodiment, the power transmitting circuit 20 is switched between an enabled state and a disabled state at a predetermined duty cycle and a predetermined duty ratio.

When the power transmitting circuit 20 is in the enabled state, the power transmitting circuit 20 emits a first power, and the power receiving circuit 21 receives the first power and converts the first power into a second power (Step 302).

Then, the power converter 22 converts the second power into an output power, and the auxiliary power generation circuit 23 converts the second power into an auxiliary power (Step 303). The output power is a DC output power or an AC output power.

Then, a step 304 is performed to judge whether the power receiving circuit 21 receives the first power. For example, the power transmitting circuit 20 judges whether the power receiving circuit 21 receives the first power.

If the judging condition of the step 304 is not satisfied, the step 301 is repeated. Whereas, if the judging condition of the step 304 is satisfied, the power transmitting circuit 20 is continuously in the enabled state, so that the auxiliary power is continuously generated (Step 305).

From the above descriptions, the power transmitting circuit 20 is controlled to be switched between the enabled state and the disabled state. When the power transmitting circuit 20 is in the enabled state to emit a first power, the power receiving circuit 21 converts the first power into a second power, the power converter 22 converts the second power into an output power, and the auxiliary power generation circuit 23 converts the second power into an auxiliary power. The output power is a DC output power or an AC output power. If the power receiving circuit 21 receives the first power, the power transmitting circuit 20 is continuously in the enabled state. Consequently, the auxiliary power is continuously generated.

In other words, if it is judged that the power receiving circuit 21 is able to receive the first power, the auxiliary power generation circuit 23 converts the second power into the auxiliary power, so that the power battery as the load or the external battery is no longer used as the source of the auxiliary power, and the wireless power transmission device of the present invention can generate the auxiliary power more stably and reduce the maintenance cost. If it is judged that the power receiving circuit 21 is unable to receive the first power, the power transmitting circuit 20 is controlled to be switched between the enabled state and the disabled state again. In some situations, the wireless power cannot be transmitted between the power receiving circuit 21 and the power transmitting circuit 20. For example, if the distance between the power receiving circuit 21 and the power transmitting circuit 20 is long, the wireless power cannot be transmitted between the power receiving circuit 21 and the power transmitting circuit 20. Under this circumstance, the power transmitting circuit 20 is not continuously in the enabled state. Consequently, the power loss of the wireless power transmission device is reduced.

Please refer to FIGS. 2 and 3 again. While the step 302, the step 303 and the step 304 are performed, the power transmitting circuit 20 has to be in the enabled state. In some embodiments, in the step 301, for successfully performing the step 302, the step 303 and the step 304 during the time interval of the power transmitting circuit 20 in the enabled state, the time interval of the power transmitting circuit 20 in the enabled state is controlled to be not shorter than the total time period of performing the step 302, the step 303 and the step 304.

Figure 4:
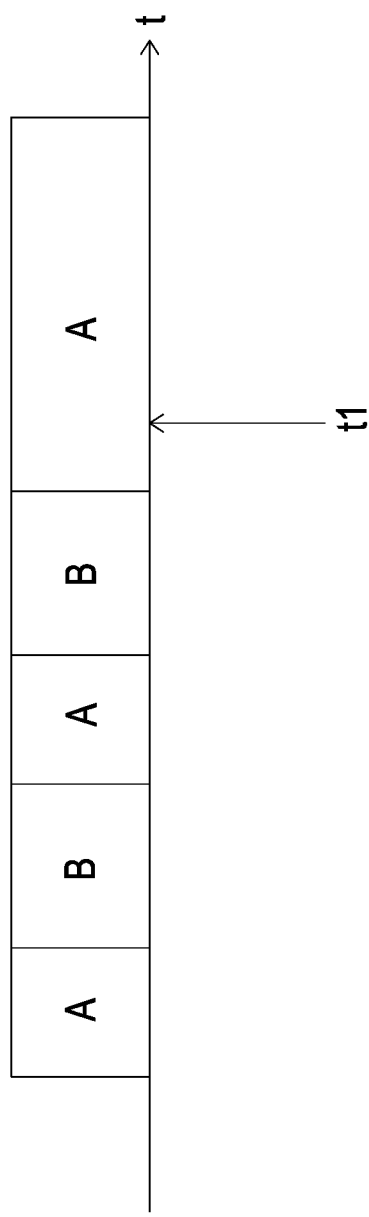
FIG. 4 schematically illustrates the concept of controlling the power transmitting circuit switched between an enabled state and a disabled state according to the power generating method of the present invention.

FIG. 4 schematically illustrates the concept of controlling the power transmitting circuit switched between an enabled state and a disabled state according to the power generating method of the present invention. The time interval A indicates that the power transmitting circuit 20 is in the enabled state. The time interval B indicates that the power transmitting circuit 20 is in the disabled state. The horizontal axis t is a time axis. At the time point t1, the power transmitting circuit 20 judges that the power receiving circuit 21 receives the first power (i.e., in the step 304). Before the time point t1, the power transmitting circuit 20 is switched between the enabled state and the disabled state. After the time point t1, the step 305 is performed. Consequently, the power transmitting circuit 20 is continuously in the enabled state.

Figure 5:
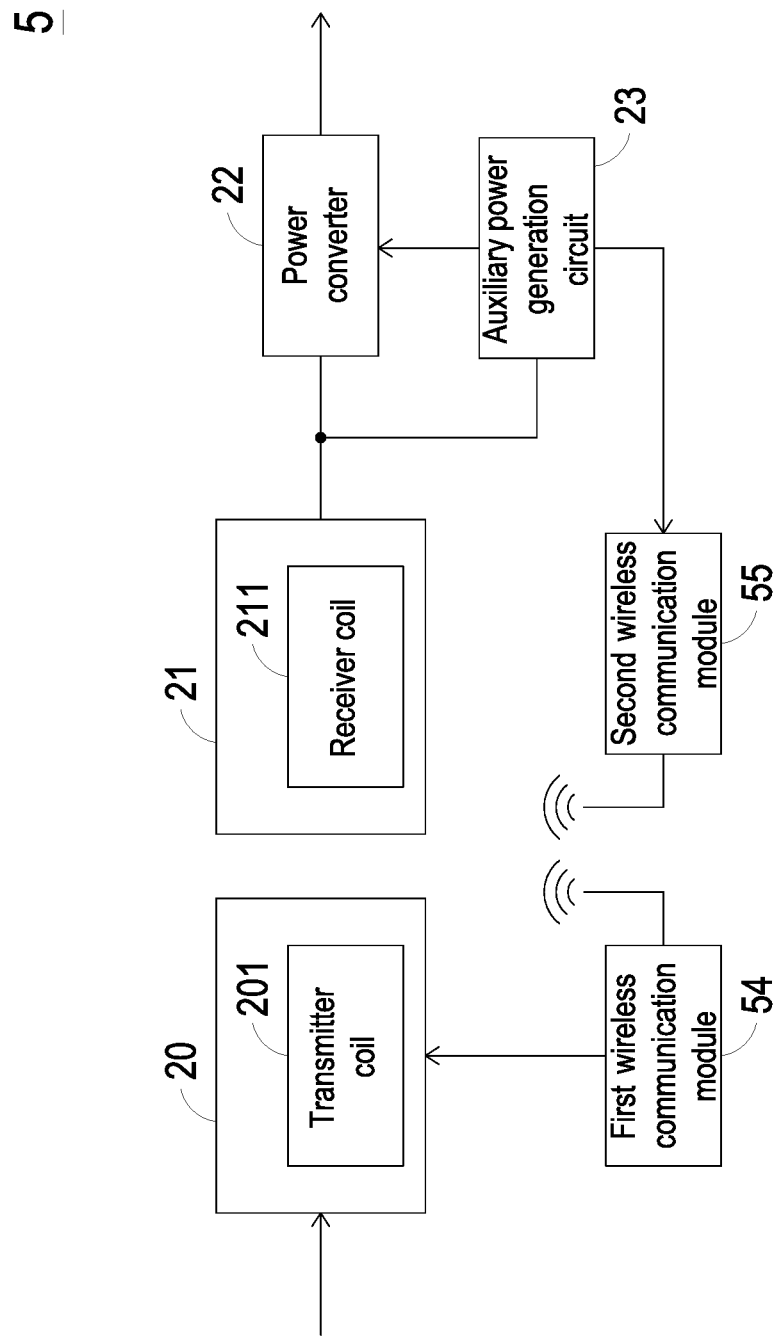
FIG. 5 is a schematic circuit diagram illustrating a variant embodiment of the wireless power transmission device of FIG. 2.

FIG. 5 is a schematic circuit diagram illustrating a variant embodiment of the wireless power transmission device of FIG. 2. Component parts and elements corresponding to those of FIG. 2 are designated by identical numeral references, and detailed descriptions thereof are omitted. In comparison with the wireless power transmission device 2 of FIG. 2, the wireless power transmission device 5 of this embodiment further comprises a first wireless communication module 54 and a second wireless communication module 55. The first wireless communication module 54 is located at the transmitter side. The second wireless communication module 55 is located at the receiver side. The second wireless communication module 55 is electrically connected with the output terminal of the auxiliary power generation circuit 23. Moreover, the second wireless communication module 55 is powered by the auxiliary power. During the operation of the second wireless communication module 55, a wireless communication signal is emitted in a radio frequency transmission manner. The first wireless communication module 54 is electrically connected with the power transmitting circuit 20. Moreover, the first wireless communication module 54 receives the wireless communication signal from the second wireless communication module 55 in the radio frequency transmission manner and transmits the wireless communication signal to the power transmitting circuit 20. According to the wireless communication signal, the power transmitting circuit 20 judges whether the power receiving circuit 21 receives the first power. Preferably but not exclusively, the radio frequency transmission manner is a Bluetooth transmission manner, a Wifi transmission manner, a Zigbee manner or a proprietary wireless networking protocol manner.

Figure 6:
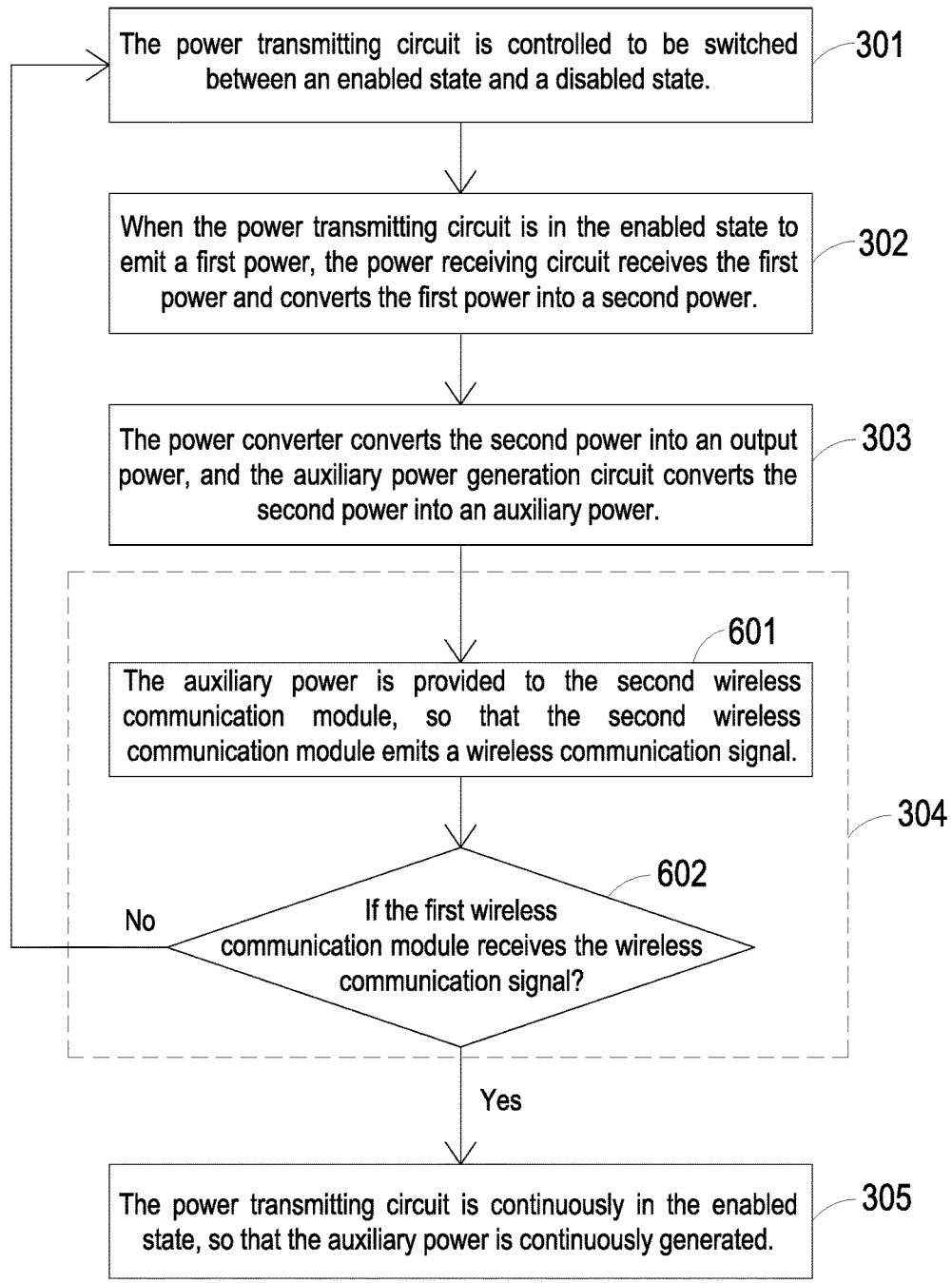
FIG. 6 is a flowchart illustrating a variant embodiment of the power generating method of FIG. 3.

FIG. 6 is a flowchart illustrating a variant embodiment of the power generating method of FIG. 3. The power generating method of this embodiment is applied to the wireless power transmission device 5 of FIG. 5. Steps corresponding to those of FIG. 3 are designated by identical numeral references, and detailed descriptions thereof are omitted. In comparison with the power generating method of FIG. 3, the step 304 of the power generating method of this embodiment comprises the step 601 and the step 602.

In the step 601, the auxiliary power is provided to the second wireless communication module 55, so that the second wireless communication module 55 emits a wireless communication signal.

Then, the step 602 is performed to judge whether the first wireless communication module 54 receives the wireless communication signal. According to the result of judging whether the first wireless communication module 54 receives the wireless communication signal, the power transmitting circuit 20 judges whether the power receiving circuit 21 receives the first power.

If the judging condition of the step 602 is satisfied, it means that the power receiving circuit 21 receives the first power. Under this circumstance, the auxiliary power generation circuit 23 generates the auxiliary power to power the second wireless communication module 55 and drive the second wireless communication module 55 to generate the wireless communication signal. Then, the step 305 is performed. If the judging condition of the step 602 is not satisfied, it means that the power receiving circuit 21 does not receive the first power. Since the auxiliary power generation circuit 23 is unable to generate the auxiliary power, the second wireless communication module 55 cannot generate the wireless communication signal. Then, the step 301 is repeated.

Moreover, in the step 601, the second wireless communication module 55 emits the wireless communication signal in a radio frequency transmission manner. In the step 602, the power transmitting circuit 20 judges whether the first wireless communication module 54 receives the wireless communication signal in the radio frequency transmission manner.

Figure 7:
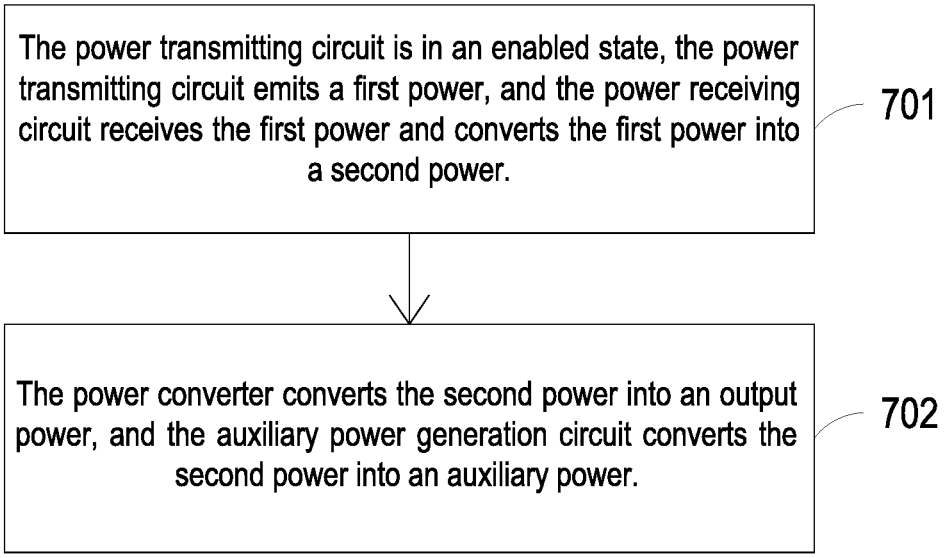
FIG. 7 is a flowchart illustrating a power generating method according to a second embodiment of the present invention.

FIG. 7 is a flowchart illustrating a power generating method according to a second embodiment of the present invention. The power generating method is applied to the wireless power transmission device 2 of FIG. 2. The power generating method comprises the following steps.

Firstly, in a step 701, the power transmitting circuit 20 is controlled to be in an enabled state. Moreover, the power transmitting circuit 20 emits a first power, and the power receiving circuit 21 receives the first power and converts the first power into a second power. When the power transmitting circuit 20 is in the enabled state, the power transmitting circuit 20 normally operates to receive the input power. Then, the power converter 22 converts the second power into an output power, and the auxiliary power generation circuit 23 converts the second power into an auxiliary power (Step 702). The output power is a DC output power or an AC output power.

In this embodiment, the wireless power transmission device can continuously and wirelessly transmit the power. That is, the power receiving circuit 21 continuously receives the first power from the power transmitting circuit 20. Since the power transmitting circuit 20 is continuously in the enabled state, the auxiliary power is continuously generated.

Figure 8:
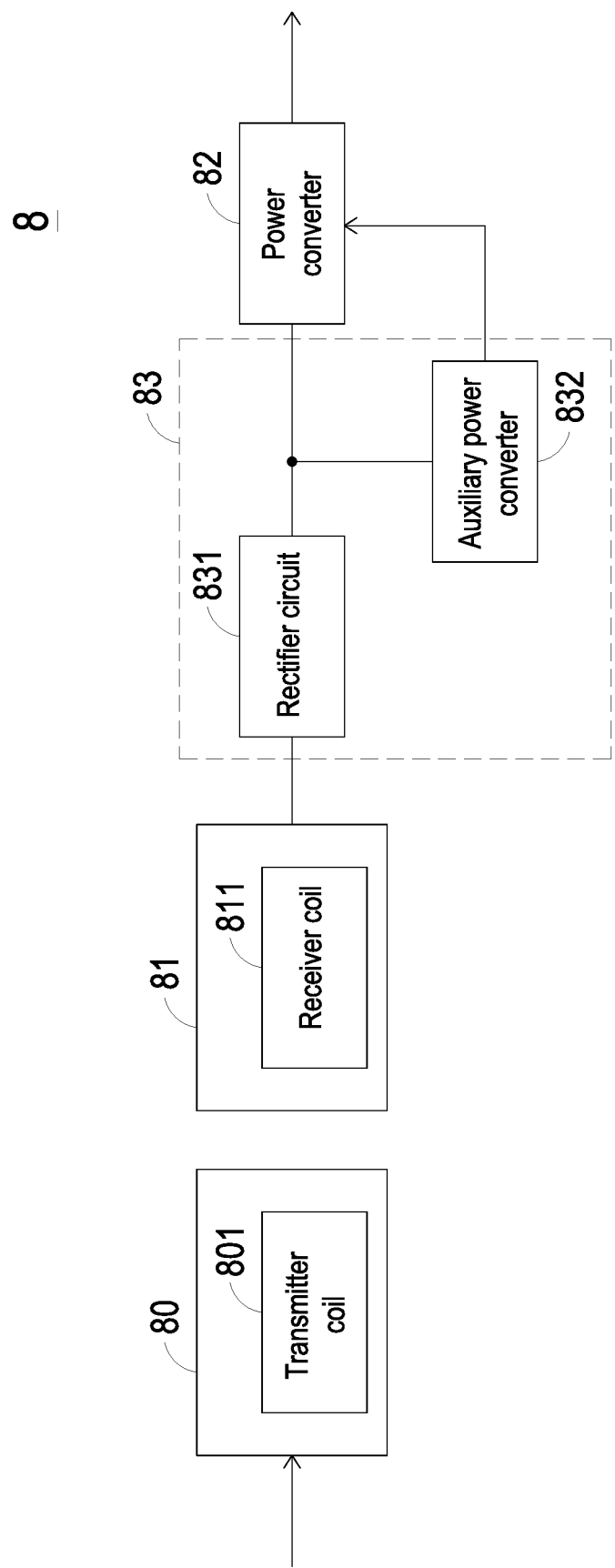
FIG. 8 is a schematic circuit diagram illustrating a wireless power transmission device according to another embodiment of the present invention.

FIG. 8 is a schematic circuit diagram illustrating a wireless power transmission device according to another embodiment of the present invention. As shown in FIG. 8, the wireless power transmission device 8 comprises a power transmitting circuit 80, a power receiving circuit 81, a power converter 82 and an auxiliary power generation circuit 83.

The power transmitting circuit 80 receives an input power and emits a first power. Moreover, the power transmitting circuit 80 and the power receiving circuit 81 are electromagnetically coupled with each other. After the first power from the power transmitting circuit 80 is received by the power receiving circuit 81, the first power is converted into a second power by the power receiving circuit 81.

The second power from the power receiving circuit 81 is converted into an auxiliary power by the auxiliary power generation circuit 83. In an embodiment, the auxiliary power generation circuit 83 comprises a rectifier circuit 831 and an auxiliary power converter 832. The rectifier circuit 831 is electrically connected with the output terminal of the power receiving circuit 81. After the second power is received by the rectifier circuit 831, the second power is rectified into a third power by the rectifier circuit 831. The power converter 82 is electrically connected with the rectifier circuit 831. After the third power is received by the power converter 82, the third power is converted into an output power by the power converter 82. The output power is a DC output power or an AC output power. The input terminal of the auxiliary power converter 832 is electrically connected with the rectifier circuit 831 and the power converter 82. The auxiliary power converter 832 converts the third power into an auxiliary power. The output terminal of the auxiliary power converter 832 is electrically connected with the power converter 82. Consequently, the auxiliary power is transmitted from the auxiliary power converter 832 to the power converter 82. Preferably but exclusively, the auxiliary power converter 832 is a linear voltage regulator, an isolated electronic switch circuit or a non-isolated electronic switch circuit.

Moreover, the power transmitting circuit 80 further comprises a transmitter coil 801, and the power receiving circuit 81 further comprises a receiver coil 811. The transmitter coil 801 emits the first power. The receiver coil 811 and the transmitter coil 801 are electromagnetically coupled with each other. After the first power from the transmitter coil 801 is received by the receiver coil 811, the first power is converted into the second power by the receiver coil 811.

Figure 9:
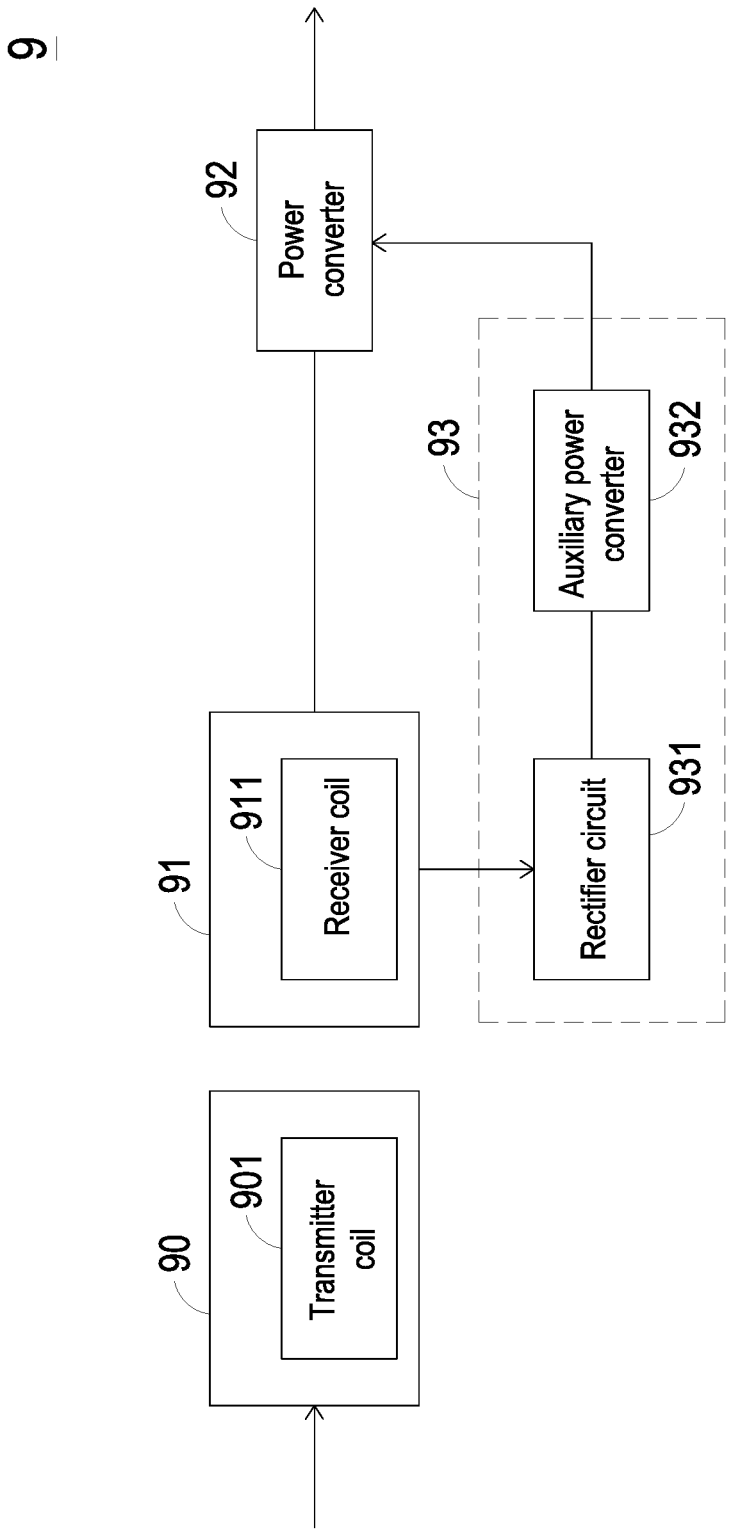
FIG. 9 is a schematic circuit diagram illustrating a wireless power transmission device according to another embodiment of the present invention.

FIG. 9 is a schematic circuit diagram illustrating a wireless power transmission device according to another embodiment of the present invention. As shown in FIG. 9, the wireless power transmission device 9 comprises a power transmitting circuit 90, a power receiving circuit 91, a power converter 92 and an auxiliary power generation circuit 93.

The power transmitting circuit 90 receives an input power and emits a first power. Moreover, the power transmitting circuit 90 and the power receiving circuit 91 are electromagnetically coupled with each other. After the first power from the power transmitting circuit 90 is received by the power receiving circuit 91, the first power is converted into a second power by the power receiving circuit 91. The power converter 92 is electrically connected with the power receiving circuit 91. The second power is converted into an output power by the power converter 92. The output power is a DC output power or an AC output power.

The second power from the power receiving circuit 91 is converted into an auxiliary power by the auxiliary power generation circuit 93. In an embodiment, the auxiliary power generation circuit 93 comprises a rectifier circuit 931 and an auxiliary power converter 932. The rectifier circuit 931 is electrically connected with the output terminal of the power receiving circuit 91. After the second power is received by the rectifier circuit 931, the second power is rectified into a third power by the rectifier circuit 931. The auxiliary power converter 932 is electrically connected with the output terminal of the rectifier circuit 931 and the power converter 92. The auxiliary power converter 932 converts the third power into an auxiliary power. Consequently, the auxiliary power is transmitted from the auxiliary power converter 932 to the power converter 92. Preferably but exclusively, the auxiliary power converter 932 is a linear voltage regulator, an isolated electronic switch circuit or a non-isolated electronic switch circuit.

Moreover, the power transmitting circuit 90 further comprises a transmitter coil 901, and the power receiving circuit 91 further comprises a receiver coil 911. The transmitter coil 901 emits the first power. The receiver coil 911 and the transmitter coil 901 are electromagnetically coupled with each other. After the first power from the transmitter coil 901 is received by the receiver coil 911, the first power is converted into the second power by the receiver coil 911.

From the above descriptions, the present invention provides a power generating method and a wireless power transmission device therefor. The power receiving circuit receives the power from the power transmitting circuit. The power from the power receiving circuit is converted into the auxiliary power by the auxiliary power generation circuit. The auxiliary power is provided to the receiver side of the wireless power transmission device. In other words, the input power received by the power transmitting circuit is used as the power source of the auxiliary power generation circuit. In comparison with the conventional technology using the receiver side battery as the power source, the technology of the present invention is cost-effective. In accordance with the present invention, the power transmitting circuit is selectively switched between the enabled state and the disabled state. If the power transmitting circuit judges the power receiving circuit receives the power from the power transmitting circuit, the power transmitting circuit is continuously in the enabled state, so that the auxiliary power is continuously generated. If the power receiving circuit does not receive the power from the power transmitting circuit, the power transmitting circuit is not continuously in the enabled state. Consequently, the power loss is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power generating method for a wireless power transmission device, the wireless power transmission device comprising a power transmitting circuit, a power receiving circuit, a power converter and an auxiliary power generation circuit, the power transmitting circuit being located at a transmitter side, the power receiving circuit, the power converter and the auxiliary power generation circuit being located at a receiver side, the power transmitting circuit receiving an input power, the power transmitting circuit and the power receiving circuit being electromagnetically coupled with each other, the power generating method comprising steps of:
   (a) controlling the power transmitting circuit to be switched between an enabled state and a disabled state;
   (b) allowing the power transmitting circuit to emit a first power and allowing the power receiving circuit to receives the first power and convert the first power into a second power when the power transmitting circuit is in the enabled state;
   (c) allowing the power converter to convert the second power into an output power, and allowing the auxiliary power generation circuit to convert the second power into an auxiliary power;
   (d) judging whether the power receiving circuit receives the first power;
   (e) if a judging result of the step (d) indicates that the first power is not received by the power receiving circuit, repeatedly performing the step (a); and
   (f) if the judging result of the step (d) indicates that the first power is received by the power receiving circuit, allowing the power transmitting circuit to be continuously in the enabled state, so that the auxiliary power is continuously generated,
   wherein the wireless power transmission device further comprises a first wireless communication module and a second wireless communication module, the first wireless communication module is located at the transmitter side, the second wireless communication module is located at the receiver side, and the step (d) further comprises steps of:
   (g) providing the auxiliary power to the second wireless communication module, so that the second wireless communication module generates a wireless communication signal; and
   (h) judging whether the wireless communication signal is received by the first wireless communication module, wherein if a judging result of the step (h) indicates that the wireless communication signal is received by the first wireless communication module, it is judged that the power receiving circuit receives the first power, wherein if the judging result of the step (h) indicates that the wireless communication signal is not received by the first wireless communication module, the step (a) is repeated.

2. The power generating method according to claim 1, wherein in the step (g), the second wireless communication module emits the wireless communication signal in the radio frequency transmission manner, and in the step (h), the power transmitting circuit judges whether the first wireless communication module receives the wireless communication signal in the radio frequency transmission manner.

3. The power generating method according to claim 2, wherein the radio frequency transmission manner is a Bluetooth transmission manner, a Wifi transmission manner, a Zigbee manner or a proprietary wireless networking protocol manner.

4. The power generating method according to claim 1, wherein the power transmitting circuit further comprises a transmitter coil, the power receiving circuit further comprises a receiver coil, and the transmitter coil and the receiver coil are electromagnetically coupled with each other, wherein in the step (b), the transmitter coil emits the first power and the receiver coil power converts the first power into the second power.

5. The power generating method according to claim 1, wherein in the step (a), the power transmitting circuit is switched between the enabled state and the disabled state at a predetermined duty cycle and a predetermined duty ratio.

6. The power generating method according to claim 1, wherein in the step (a), a time interval of maintaining the power transmitting circuit in the enabled state is not shorter than a total time period of performing the step (b), the step (c) and the step (d).

7. The power generating method according to claim 1, wherein in the step (f), the auxiliary power is provided to the power converter.

8. A wireless power transmission device, comprising:
   a power transmitting circuit receiving an input power and emitting a first power;
   a power receiving circuit, wherein the power transmitting circuit and the power receiving circuit are electromagnetically coupled with each other, and the power receiving circuit receives the first power and converts the first power into a second power;
   a power converter for converting the second power into an output power; and
   an auxiliary power generation circuit electrically connected with the power receiving circuit and the power converter, wherein the auxiliary power generation circuit converts the second power into an auxiliary power and transmits the auxiliary power to the power converter,
   wherein the auxiliary power generation circuit comprises a rectifier circuit and an auxiliary power converter, wherein the rectifier circuit is electrically connected with the power receiving circuit to rectify the second power into a third power, and the auxiliary power converter is electrically connected with the rectifier circuit and the power converter to convert the third power into the auxiliary power.

9. The wireless power transmission device according to claim 8, wherein the power transmitting circuit further comprises a transmitter coil, the power receiving circuit further comprises a receiver coil, and the transmitter coil and the receiver coil are electromagnetically coupled with each other, wherein the transmitter coil emits the first power, and the receiver coil receives the first power and converts the first power into the second power.

10. The wireless power transmission device according to claim 8, wherein the power converter is electrically connected with the power receiving circuit to receive the second power and convert the second power into the output power.

11. The wireless power transmission device according to claim 8, wherein the power converter is electrically connected with the rectifier circuit to convert the third power into the output power.

12. A power generating method for a wireless power transmission device, the wireless power transmission device comprising a power transmitting circuit, a power receiving circuit, a power converter and an auxiliary power generation circuit, the power transmitting circuit being located at a transmitter side, the power receiving circuit, the power converter and the auxiliary power generation circuit being located at a receiver side, the power transmitting circuit receiving an input power, the power transmitting circuit and the power receiving circuit being electromagnetically coupled with each other, the auxiliary power generation circuit comprising a rectifier circuit and an auxiliary power converter, the rectifier circuit being electrically connected with the power receiving circuit, the auxiliary power converter being electrically connected with the rectifier circuit and the power converter, the power generating method comprising steps of:

(i) controlling the power transmitting circuit to be in an enabled state, wherein when the power transmitting circuit is in the enabled state, the power transmitting circuit emits a first power and the power receiving circuit receives the first power and converts the first power into a second power; and (j) allowing the power converter to convert the second power into an output power, allowing the rectifier circuit to rectify the second power into a third power, and allowing the auxiliary power converter to convert the third power into an auxiliary power.

13. The power generating method according to claim 12, wherein in the step (j), the auxiliary power is provided to the power converter.

* * * * *